(No Model.)
C. C. MOORE, Jr.
SAMPLING MACHINE.
No. 573,610. Patented Dec. 22, 1896.
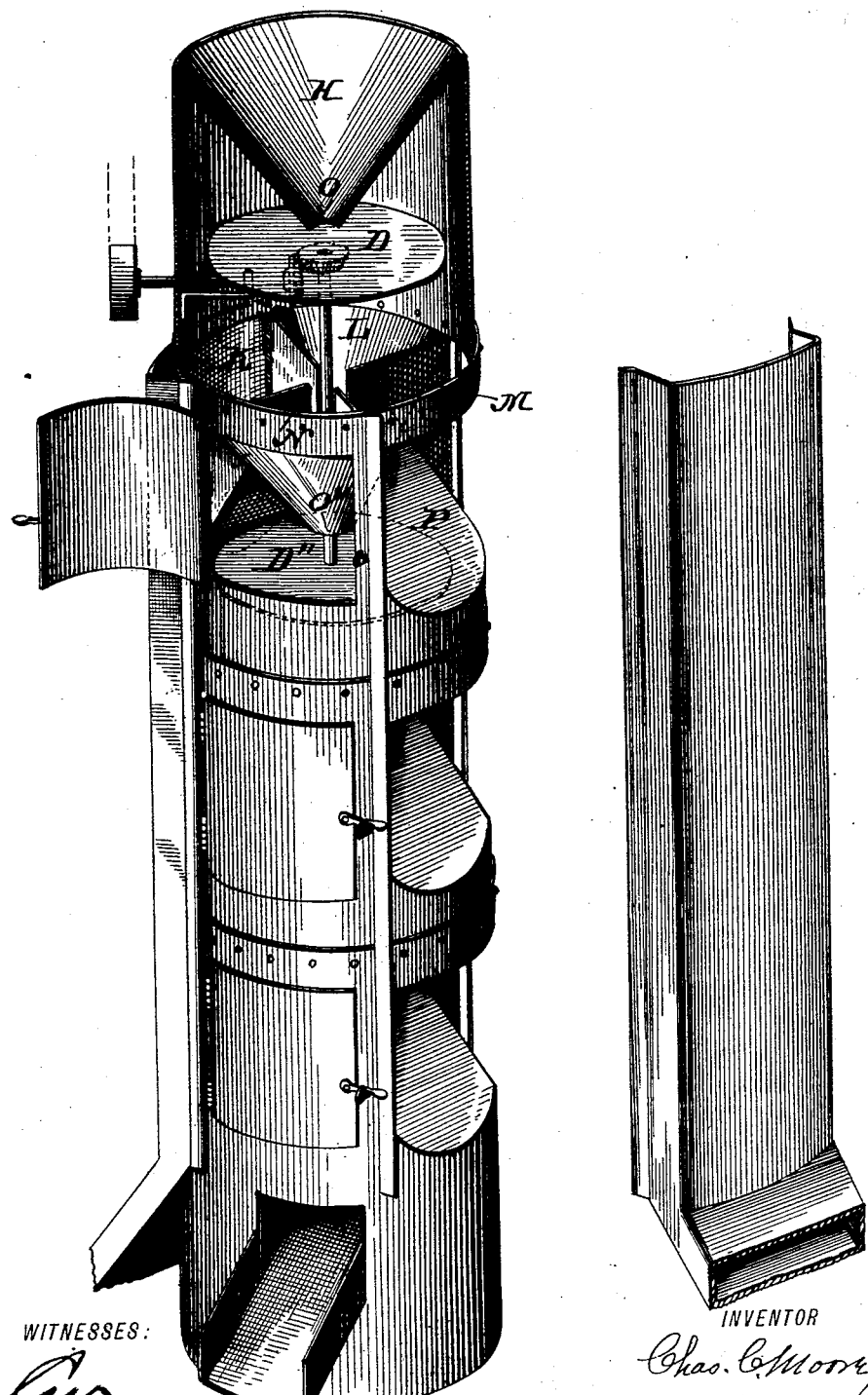
WITNESSES:
INVENTOR
Chas. C. Moore Jr.

UNITED STATES PATENT OFFICE.

CHARLES C. MOORE, JR., OF LEXINGTON, KENTUCKY.

SAMPLING-MACHINE.

SPECIFICATION forming part of Letters Patent No. 573,610, dated December 22, 1896.

Application filed June 1, 1894. Serial No. 513,147. (No model.)

*To all whom it may concern:*

Be it known that I, CHARLES C. MOORE, Jr., a citizen of the United States, residing at Lexington, in the county of Fayette, State of Kentucky, have invented a new and useful Sampling-Machine, of which the following is a specification.

My invention relates to improvements in sampling-machines in which the material, such as ore, fertilizers, &c., is distributed radially by being put on the center of a horizontal revolving disk. The material, after being thrown off the disk by the centrifugal force, falls into the sections of a conical hopper which is segmentally divided by vertical partitions, the center of the hopper being directly under that of the disk. Alternate portions are discharged, while the remaining portions sink down and come together in the lower part of the hopper, which empties onto the center of a second similar revolving disk, when the operation is repeated, thus taking out alternate portions at every repetition. I attain this object by the mechanism illustrated in the accompanying drawing, which is a perspective view with a door open and a portion of the cylinder broken away.

The view shows the machine arranged for three successive operations, thereby taking out one-eighth as the sample. It may be constructed with any number of disks and hoppers, thus making the sample any desired portion of the whole.

The material to be sampled is put into the feed-hopper H, and, passing through the outlet O, falls onto the center of the revolving disk D. It is then thrown out radially by the centrifugal force and, striking the side of the inclosing cylinder, drops down into the quartering-hopper K L M N O''. The portions dropping in the quarters K and M are carried off by the inclined surfaces, one of which is shown at P, while that dropping in the quarters L and N runs down and meets in the lower part of the hopper and passes through the opening O'' onto the center of a second revolving disk D'', after which the operation is repeated as often as desired. The disks are fixed on a vertical shaft, which is run by the pulley, as shown. The discarded material is carried off by the vertical chutes, one of which is removed in the illustration.

What I claim by my invention, and desire to obtain by Letters Patent, is—

1. The combination of a feed-hopper and a revolving horizontal disk, the outlet of the hopper being placed directly over and a short distance above the center of the disk, so that as the material feeds onto the disk, it is thrown off freely by the action of centrifugal force.

2. The combination of a feed-hopper and a revolving horizontal disk, the outlet of the hopper being placed directly over and a short distance above the center of the disk, so that as the material feeds onto the disk, it is thrown off freely by the action of centrifugal force; and a receptacle so constructed that a portion of the circumferential mass which falls from the disk, will be retained as a sample.

3. The combination of a casing; a feed-hopper; a revolving shaft at the center of the casing; upon which shaft is rigidly fixed a disk whose center is a short distance below the outlet of the hopper, the diameter of the disk being less than that of the casing so as to allow the material to pass off the disk; and a receptacle whose diameter is that of the casing, so constructed that a portion of the circumferential mass which falls from the disk, will be retained as the sample; and openings in the side of the casing to allow material to be discarded.

CHARLES C. MOORE, JR.

Witnesses:
CHARLES W. DABNEY, Jr.,
ROBERT E. WAIT.